(12) United States Patent
Mavinakayanahalli et al.

(10) Patent No.: US 8,037,459 B2
(45) Date of Patent: Oct. 11, 2011

(54) RECOVERY FROM NESTED EXCEPTIONS IN AN INSTRUMENTATION ROUTINE

(75) Inventors: Ananth Narayan Mavinakayanahalli, Bangalore (IN); Prasanna S. Panchamukhi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1106 days.

(21) Appl. No.: 11/830,946

(22) Filed: Jul. 31, 2007

(65) Prior Publication Data
US 2009/0037710 A1 Feb. 5, 2009

(51) Int. Cl.
*G06F 9/44* (2006.01)
*G06F 9/45* (2006.01)

(52) U.S. Cl. .................. 717/129; 717/128; 717/130

(58) Field of Classification Search ........... 717/124–131
See application file for complete search history.

(56) References Cited

U.S. PATENT DOCUMENTS

| | | | |
|---|---|---|---|
| 5,628,016 A | 5/1997 | Kukol | |
| 6,708,326 B1 * | 3/2004 | Bhattacarya | 717/124 |
| 6,826,746 B2 * | 11/2004 | Evans et al. | 717/124 |
| 6,941,545 B1 * | 9/2005 | Reese et al. | 717/130 |
| 7,000,225 B2 * | 2/2006 | Sangavarapu et al. | 717/129 |
| 7,013,456 B1 * | 3/2006 | Van Dyke et al. | 717/130 |
| 7,058,928 B2 * | 6/2006 | Wygodny et al. | 717/128 |
| 7,069,544 B1 * | 6/2006 | Thekkath | 717/128 |
| 7,134,116 B1 * | 11/2006 | Thekkath et al. | 717/128 |
| 7,293,259 B1 * | 11/2007 | Dmitriev | 717/130 |
| 7,293,260 B1 * | 11/2007 | Dmitriev | 717/130 |
| 7,386,839 B1 * | 6/2008 | Golender et al. | 717/131 |
| 7,389,494 B1 * | 6/2008 | Cantrill | 717/125 |
| 7,496,903 B2 * | 2/2009 | Rees et al. | 717/130 |
| 7,519,960 B2 * | 4/2009 | Mei et al. | 717/129 |
| 7,523,446 B2 * | 4/2009 | Keniston | 717/129 |
| 7,568,186 B2 * | 7/2009 | Bhattacharya | 717/130 |
| 7,716,641 B2 * | 5/2010 | McHugh et al. | 717/124 |
| 7,823,135 B2 * | 10/2010 | Horning et al. | 717/127 |

OTHER PUBLICATIONS

Govindarajan, "Exception handlers in funcational programming languages", IEEE, pp. 826-834, 1993.*
Tikir et al, "Effiient instrumentation for code coverage testing", ACM, pp. 86-96, 2002.*
Yu et al, "LeakProber: a framework for profiling sensitive data leakage paths", ACM CODASPY, pp. 75-85, 2011.*
Kumar et al, "Tdb: A source level debugger for dynamiclaly translated programs", ACM AADEBUG, pp. 123-132, 2005.*
Donnamaie E. White "Bit-Slice Design: Controllers and ALUs" http://www10.dacafe.com/book/parse_book.php?article=BITSLICE/BIT_CHAP_4/bitCh4C.html.
Brenda M. Ozaki, Eduardo B. Fernandez, Ehud Gudes, "Software Fault Tolerance in Architectures with Hierarchical Protection Levels" Jul./Aug. 1988 (vol. 8, No. 4) pp. 30-43.

* cited by examiner

*Primary Examiner* — Anil Khatri
(74) *Attorney, Agent, or Firm* — Lee & Associates, P.C.; Libby Z. Toub (57) ABSTRACT

A system and method for instrumentation of software, the software comprising a set of instructions (program or code) which are executable on a processor of a system, for example a computer system. A location in the instruction to insert a probe is first identified. The instruction is replaced with the probe by copying the instruction to a predefined location. The instruction is executed in the kernel space. A first exception is generated upon encountering the probe and calling a first exception handler, and the first exception handler is configured to call an instrumentation routine. A second exception is generated when the instrumentation routine encounters an error and calling a second exception handler, recovering from the exceptions and returning to a sane state to continue normal execution of the instruction.

11 Claims, 4 Drawing Sheets

RECOVERY FROM NESTED EXCEPTIONS IN AN INSTRUMENTATION ROUTINE

FIELD OF THE INVENTION

This invention relates to exception handling, and in particular to software for detecting and robustly recovering from nested exceptions when software is executing in kernel mode.

BACKGROUND OF THE INVENTION

Conventionally, dynamic instrumentation mechanisms such as profiling/tracing infrastructure run in the exception context. Such mechanisms typically work by modifying the text stream at the desired location to induce a software exception, trap the exception and as a consequence, are able to run the instrumentation code, which then gathers the required data. It is especially critical that the instrumentation code run is robust, free of errors and does not induce any subsequent exceptions, potentially causing irreparable damage to the system, and more so when the instrumentation code is run in kernel mode to gather relevant kernel data.

Typically, operating systems define a default exception handler for every exception, such that, when an exception occurs, the operating system saves the current system state (specifically, the registers at the time of exception), and this system state is passed on to the system's default exception handler. In normal circumstances, the system's default exception handler executes and then while returning from the exception handler the system state is restored from the earlier saved system state. Thus, the operating system continues its normal execution after handling the exceptions.

Instrumentation of the software can be done in various ways, for example:

By hooking the system exception handlers to call into the instrumentation code, where the exceptions are not induced, but normally occur as a normal consequence of program execution (such as page-faults). By hooking the page-fault exception handler itself, it becomes possible to run instrumentation code; or Inducing exceptions by inserting code in the normal program stream and/or using the platform-provided hardware debug facilities to generate exceptions when the inserted code is executed.

When such instructions are executed, the exception handler is invoked. This exception handler in turn executes the instrumentation code, and is configured to collect the required information in the exception context.

Figure 1A:
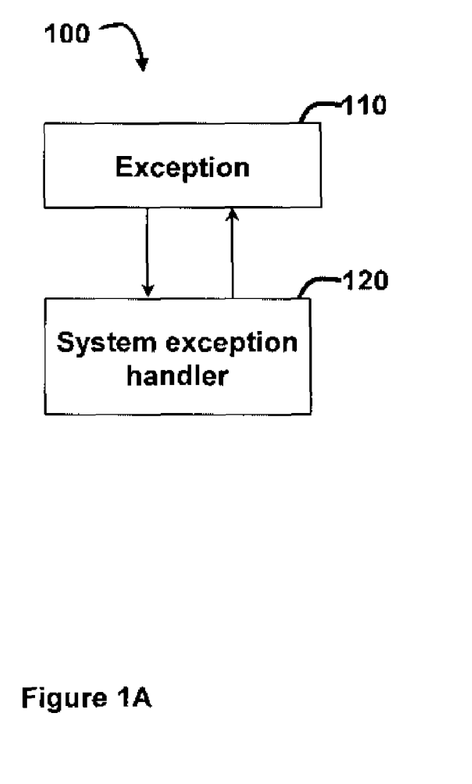
FIG. 1A illustrates a prior art embodiment of conventional exception processing 100.
Figure 1B:
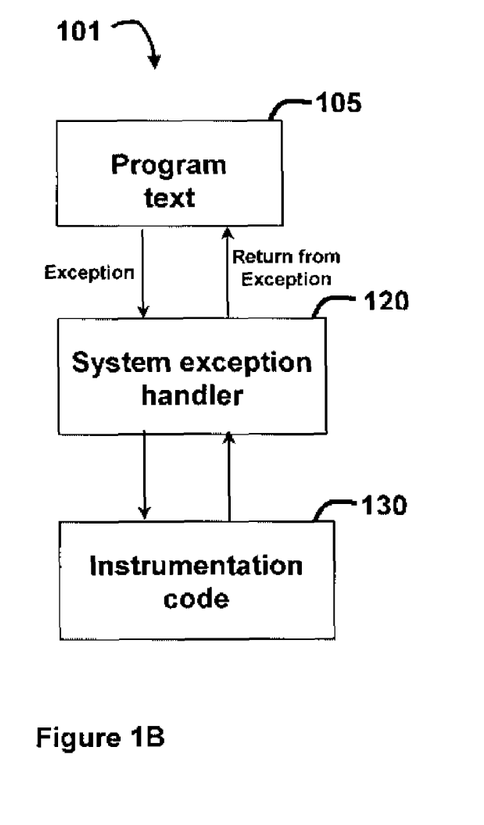
FIG. 1B illustrates a prior art embodiment of exception processing 101 with instrumentations code.

FIG. 1A illustrates an embodiment of conventional exception processing 100. Every exception 110 will have associated with it, a default handler 120 that the operating system will run, in case the said exception 110 occurs. In the conventional case, when an exception 110 occurs, the default exception handler 120 will run and take care of executing specific actions to recover from the exception 110. FIG. 1B illustrated an embodiment of exception processing 101 with instrumentations code. A program text 105 such as a set of instructions is executed on a system. Most instrumentation code 130 run off the system exception handler 120. Given that the system state is provided as input at the entry to the exception handler 110, the instrumentation code 130 will also have access to the instrumentation code. The exception stage and the return from exception stage occur between immediately before and after the system exception handler 120 is executed.

Figure 1C:
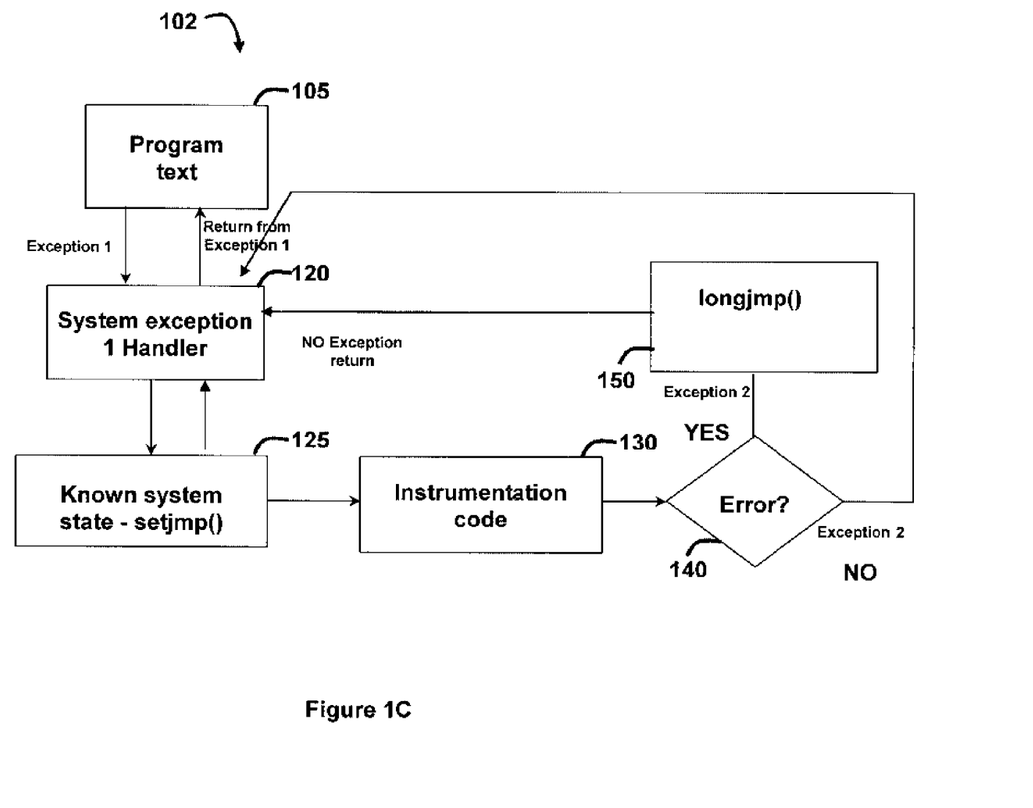
FIG. 1C illustrates a prior art embodiment of exception processing 102 using setjmp( ) and/or longjmp( ) trampolines.

FIG. 1C illustrates an embodiment of exception processing 102 using setjmp( ) and/or longjmp( ) trampolines as in the prior art. Here, the function calls or trampolines setjmp( ) 125 and/or longjmp( ) 150 to try and recover from nested exceptions. When the program 105 is instrumented a first exception occurs, which is handled by the first system exception handler 120, preferably a known system state wherein the trampoline setjmp( ) 125 is assigned to the first system exception and is configured to save the register context after which an instrumentation code 130 gets executed. Under normal circumstances, the instrumentation code 130 executes fine and returns to the trampoline setjmp( ) 125, from where it is possible to return to the first system exception handler 120.

If the instrumentation code 130 generates another further exception, which is typically encountered in the case of nested exception, an entry is recognized to be due to an error 140 that occurred due to instrumentation code 130, the error being caused for example by bugs in the instrumentation code 130, while already in exception context 120 and therefore the trampoline longjmp( ) 150 is executed so as to do a jump to the known sane system state in the first system exception handler 120. This will lead to a situation where the number of exception entries is more than the number of exception returns. This will lead to a situation where the exception stack is not offset correctly due to unbalanced entry/return from exceptions. We may end up with a situation where the stack corruption and/or return from interrupt exceptions lead to incorrect system operation down the line.

Without a way to provide a method to restore the system from nested kernel exception and bringing the system back to sane state during instrumentation, the promise of this technology may never be fully achieved.

SUMMARY OF THE INVENTION

Accordingly, the present invention provides a system and method for instrumentation of software, the software comprising a set of instructions (program or code) which are executable on a processor of a system, for example a computer system. A location in the instruction to insert a probe is first identified. The instruction is replaced with the probe by copying the instruction to a predefined location. The instruction is executed in the kernel space. A first exception is generated upon encountering the probe and calling a first exception handler, and the first exception handler is configured to call a instrumentation routine. A second exception is generated when the instrumentation routine encounters an error and calling a second exception handler. Returning to a trampoline [longjmp( )] occurs instead of returning to the instrumentation routine that generated the exception. Recovery from the first and second exceptions occurs and a sane state is restored by the trampoline [longjmp( )].

DETAILED DESCRIPTION

Where reference is made in any one or more of the accompanying drawings to steps and/or features, which have the same reference numerals, those steps and/or features have for the purposes of this description the same function(s) or operation(s), unless the contrary intention appears. The terms "software", "code", "program", "computer program", "set of instructions" or "instruction" are used synonymously. The term "probe" or breakpoint" is also used synonymously. The terms "exception" or "exception handling" or "programming language construct" or "run time error condition" are used synonymously and mean a computer hardware mechanism designed to handle runtime errors or other problems (exceptions) which occur during the execution of a computer program.

Exceptions are a control transfer mechanism, usually used to treat a special case or handle an error condition. Exceptions are error conditions caused by an illegal instruction. Exceptions typically are synchronous events, in contrast to interrupts, which are asynchronous Exceptions can be hardware-related or software-related errors. For example, exception handling is a C++ mechanism that allows a detector of an error to pass an error condition to code (the exception handler), for example an instrumentation code, that is prepared to handle such an exception. Typically, an exception is raised by a throw statement within a try block and handled by a catch clause. Exceptions are sometimes also referred to a condition, often an error, which causes the program or microprocessor to branch into a different routine. The terms interrupt and exception are very close in meaning. Both can be used to refer to either hardware or software. Performing some actions in response to the arising of an exception is referred to as handling the exception.

Figure 2:
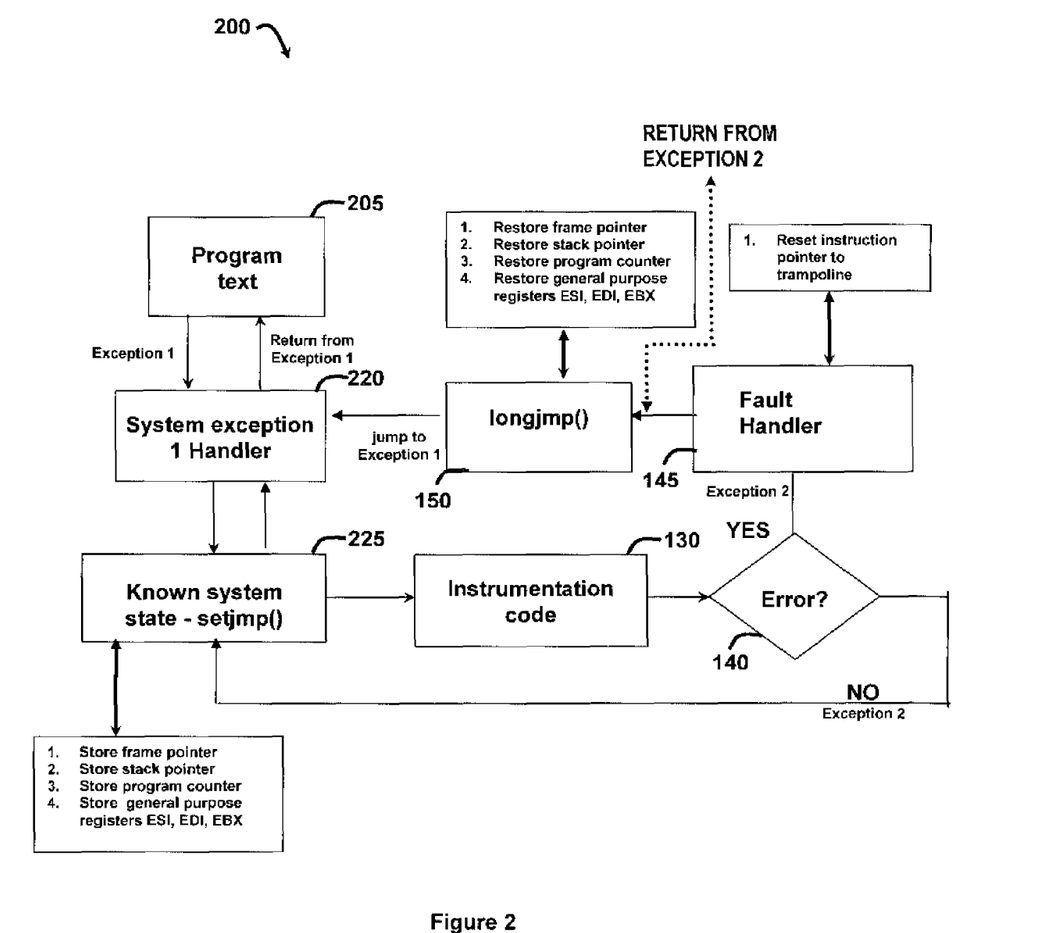
FIG. 2 illustrates an exemplary embodiment of a method 200 of exception processing in accordance with the present invention.

FIG. 2 illustrates an exemplary embodiment of a method for instrumentation 200 of exception processing in accordance with the present invention. The embodiment disclosed here is with reference specifically to the Intel architecture, as an example. It should be apparent to a person skilled in the art that this analogy can be extended to other architectures as well. The method for instrumentations 200 i.e., exception processing using setjmp( ) and/or longjmp( ) function calls. The setjmp( ) 125 and/or longjmp( ) 145 function calls, i.e., trampolines are typically used to try and recover from nested exceptions. Here, two trampolines (hereinafter also referred to as functions) setjmp( ) 125 and longjmp( ) 150 are used to recover from nested exceptions that can occur during instrumentation in the kernel mode. When the program 205 is instrumented a first exception occurs, which is handled by the first system exception handler 220, preferably a known system state wherein the trampoline setjmp( ) 225 is assigned to the first system exception and is configured to perform the following tasks 1. Store a frame pointer,
2. Store a stack pointer,
3. Store a program counter, and
4. Store general purpose register ESI, EDI and EBX, where ESI<EDI and EBX are register names in the Intel architecture, before execution of the instrumentation code 230. Under normal conditions of instrumentation of the program 205, the instrumentation code 230 executes satisfactorily and returns to the trampoline setjmp( ) 225, from where it is possible to return to the first system exception handler 220.

If the instrumentation code 230 during instrumentations does not generate an exception, wherein a check is made 140, then the control is transferred back to the known system state setjmp( ) 225. If during instrumentation, a check is performed at 140 and it is determined that a further exception has been generated in the instrumentation code, which is typically encountered in the case of nested exception, the fault handler 145 is executed. The fault handler 145 is configured to perform the following tasks 1. reset instruction pointer to the trampoline—longjmp( ) trampoline an entry is recognized to be due to an error 140 that occurred due to instrumentation code 130, the error being cause for example by bugs in the instrumentation code 130. After the fault handler 145 has reset instruction pointer to the trampoline, the fault handler 145 passes control to the longjmp( ) trampoline.

The longjmp( ) trampoline 250 is executed to such that the system recovers from the nested kernel exceptions and the system is brought back to a sane state. The longjmp( ) trampoline is configured to perform the following tasks 1. Restore the frame pointer
2. Restore the stack pointer
3. Restore the program counter
4. Restore the general purpose registers ESI, EDI and EBX After performing these tasks the longjmp( ) trampoline recovers from the nested kernel exceptions thereby bringing the system back to a sane state to continue performing normal executions.

In a further embodiment, the method for instrumentation of software, where the software typically consists of a set of instructions, includes first identifying a location in the instruction to insert a probe. After identifying a location where the probe needs to be inserted the next step included replacing the instruction with the probe by copying the instruction to a predefined location. The next step includes executing the instruction in the kernel space. The next step includes generating a first exception upon encountering the probe and calling a first exception handler, and the first exception handler is configured to call a instrumentation routine. The next step includes generating a second exception when the instrumentation routine encounters an error and calling a second exception handler. And finally recovering from the exceptions and returning to a sane state to continue normal execution of the instruction.

Prior to performing the step of replacing the instruction, the method includes a step of associating an instrumentation routine to be executed upon encountering the inserted probe, wherein the instrumentation routine enables a user to relevant tracing or debugging information. The tasks performed by the method have been disclosed previously, which include amongst other saving a system register state as part of the first exception; executing the first exception handler; saving the register contents of a first trampoline [setjmp( )] prior to executing the instrumentation routine. Saving register contents includes collecting essential debug information. The second exception handler returns to a second trampoline [longjmp( )] instead of returning to the instrumentation routine that generated the exception, wherein the second trampoline [longjmp( )] restores the system to sane state and continues normal execution. In a further embodiment, replacing the instruction with a breakpoint instruction further comprises flushing the processor cache if required.

A distinct advantage of this disclosure is the introduction of a trampoline between the exception handler and the instrumentation code. This trampoline is configured for saving data corresponding to a known sane system state, using a suitable mechanism, one of which is via a setjmp( ), before invoking the user defined instrumentation code. The instrumentation code now runs in the said exception context. Under normal circumstances, the instrumentation code executes in a satisfactory manner and returns to the trampoline, from where return to the system exception handler is possible. If the instrumentation code generates a further exception, this is a case of nested exception, an entry is then made into the system's fault handler.

In the fault handler, it is determined that the entry is due to a fault that occurred as a consequence of running while already in exception context and hence modify the address to return from this exception to point to a longjmp( ) trampoline. Under normal exception handling, once the exception is handled, control is returned back to the point in code where the exception was generated. In this case modify the return address to point to a known location [trampoline longjmp( )]. After completion a return from exception (this return is for the second/nested exception) is performed. As a consequence, the pointer is now at a known location [trampoline longjmp( )] where information can be gathered as discussed previously. After the longjmp( ) is executed, automatically control is transferred to the system exception handler. From this point on, execution continues as normal. An advantage of the above is that such robust fault handling in kernel probes (kprobes) in Linux can be used efficiently.

Figure 3:
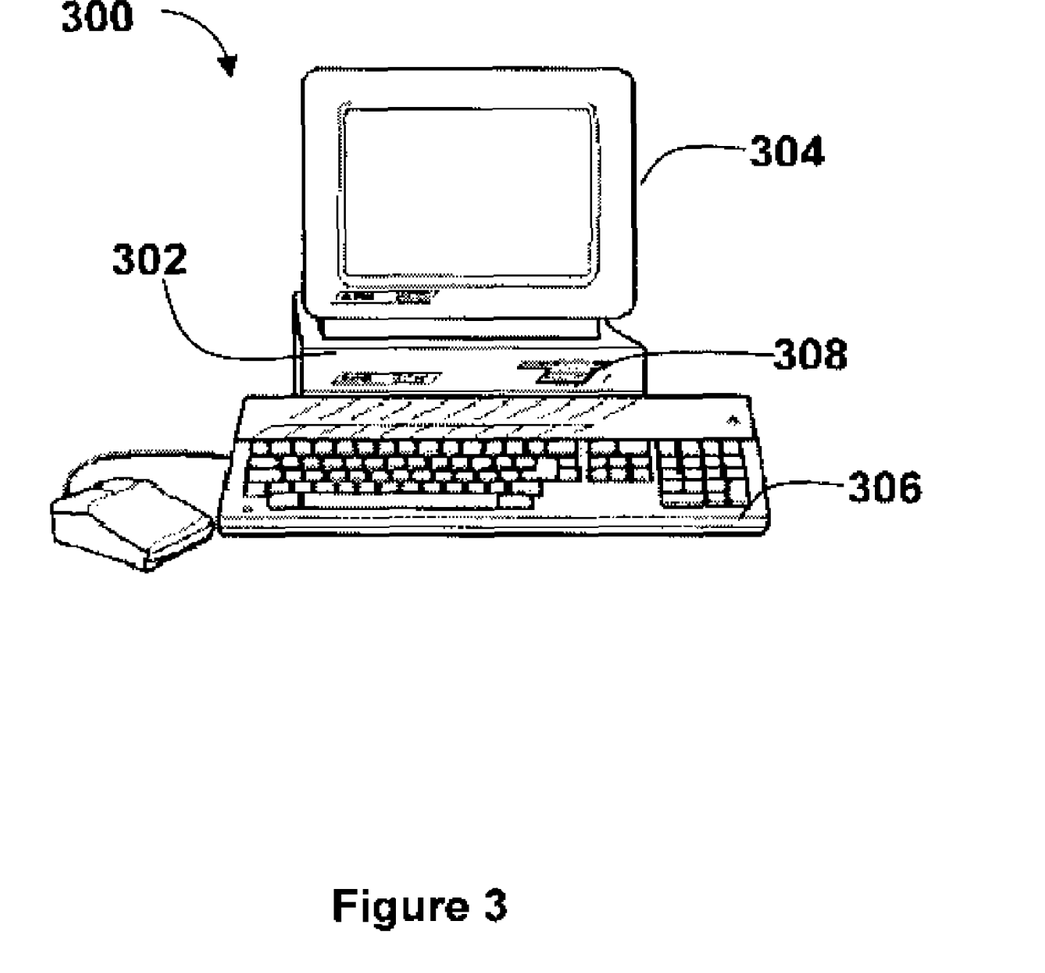
FIG. 3 illustrates an exemplary embodiment of a system 300 on which the method of FIGS. 1-3 may be implemented.

In a further embodiment, FIG. 3 illustrates an exemplary embodiment of a system 300 on which the method of FIG. 2 may be implemented. The system 300 preferably a processing system or a computing system, include and are not limited a variety of electronic devices such as desktop computers, application servers, web servers, database servers and the like and portable electronic devices such as mobile phones, personal digital assistants (PDAs), pocket personal computers, laptop computers, and the like, which are capable of instrumenting software and generating a UML protocol state machine. It should be apparent to a person skilled in the art that any device, e.g. electronic devices, portable electronic devices, handheld electronic devices and the like, which includes at least a processor and a memory configured execute scripts falls within the scope of the present invention.

The system 300 includes at least a processor and a memory in which the present invention may be implemented is depicted in accordance with one embodiment. The system 300 depicted includes a system unit 302, which further includes essential hardware components such as a microprocessors, memory, connectors, system bus, power unit etc (some of which are not shown in the figure), a video display terminal 304, an input device 306, the input device including a keyboard, mouse, a joystick, touchpad, touch screen, trackball, microphone, etc., and storage devices 308, which may include floppy drives and other types of permanent and removable storage media. Although the depicted representation shows a stand alone system 300, further embodiments of the present invention may be implemented in other types of systems 300, coupled over a network. For example a wired network, wireless network work or a combination thereof. The system 300 also preferably includes a graphical user interface (GUI) that may be implemented by means of systems software residing in computer readable media in operation within the system.

The memory associated with any system 300 is typically is an electronic holding place for instructions and/or data accessed, such as a semiconductor device e.g. random access memory (RAM), such that microprocessor of the system 300 can access the instruction and/or data rather quickly. When the system is in normal operation, the memory usually contains the main parts of the operating system and some or all of the application programs and related data that are being used by the computing system. Accessing data via the memory is faster than reading from a hard drive, so having a larger RAM makes it quick to retrieve recently accessed files, applications, and other data. Further, all programs must be run through the memory before they can be used. The system unit 302 typically containing these components is used for processing and/or executing and instrumenting the software. The input device 306 is to record the user input and data may be entered via this input device 306 to perform specific functions. The video display terminal 304 is used to display the results to the user, for example the recorded input, the changed input, the associated actions, the responses etc; and is configured the method disclosed previously.

For those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention. The system depicted in FIG. 1 may be, for example, an IBM eServer pSeries® system, a product of International Business Machines Corporation in Armonk, N.Y., running the Advanced Interactive Executive (AIX™) operating system or LINUX™ operating system.

EXAMPLE

Consider the software as defined below.

A program is defined as a sequence of instructions. Consider a program to add two numbers. Such a program would contain the following instructions for the addition:
1. Get the first number
2. Get the second number
3. Add the two numbers
4. Print the result of addition The above program may be translated into the following pseudo code:
1. get A
2. get B
3. add A, B
4. print result This program contains four instructions. Consider that this program needs to be debugged using a method of dynamic instrumentation. The strategy is to find out the values of the two numbers before the step of adding the number, such that verification may be performed to determine whether the program uses the correct input values or not. The disclosed invention is detailed below:

The first step includes identifying a location to put a probe or breakpoint: a probe or breakpoint at "location 3", so that the program execution can be broken by the probe at "location 3" and it becomes possible to determine the inputs to the program.

The second step includes copying the original instruction at the identified into an allocated memory. A breakpoint instruction needs to be inserted at "location 3" and therefore the original instruction at "location 3" (3: add A, B) should not be overwritten. Therefore, the original instruction is stored or saved at a safe location; for example, an allocated memory address, referenced as original_instruction_address.

The third step includes replacing the original instruction with a breakpoint instruction. Once the original instruction has been saved, the breakpoint instruction is inserted. After inserting the breakpoint instruction, the program defined above is:
1. get A
2. get B
3. BREAK HERE
4. print result where the original_instruction_address: add A, B; indicating that the instruction as "location 3" is stored/saved at the desired location.

The fourth step includes generating an exception when the breakpoint is encountered. When the program execution encounters the breakpoint at "location 3", an exception is generated and the control is transferred to an exception handler. The exception handler is a routine provided by Operating System Kernel, where required debugging information can be logged. For example, the values of A and B need to be logged.

```
first_exception_handler( )
{
}
```

The fifth step includes exception handler saving register context before executing the instrumentation code. Before the exception handler calls the instrumentation code, it saves sufficient register context in a trampoline called setjmp( ). This information is helpful to recover from any other exceptions such as faults that occur during executing the instrumentation code.

```
first_exception_handler( )
{
    if (setjmp( ) ==0) {
        return 1;
    }
    instrumentation_code( );
}
```

The sixth step includes instrumentation code generating another exception and the second exception handler gets executed. If the instrumentation code executing in the exception code generates another exception, then the system becomes unstable and may cause system crash. Thus the second exception handler gets executed:

```
instrumentation_code( )
{
    char *p =NULL;
    *p = 1000; <<<<<<<<<<<<<<Generates 2nd exception
}
```

The seventh step includes returning to the longjmp( ) trampoline, which is an important aspect of this disclosure. Check if the second exception is due to instrumentation code that was executed in the first exception context. In such a case, return to the longjmp( ) trampoline instead of returning to the instrumentation instructions that were executed in the first exception context which cased second exception, thus returning from the second exception context.

```
second_exception_handler( )
{
    return to longjmp_trampoline( )
}
```

The eighth step includes restoring the system to a sane state. Now the control is at the first exception context, this longjmp( ) trampoline restores the system to a sane state using the register information saved in the fifth step described previously.

```
longjmp_trampoline( )
{
    restore state from setjmp( );
    return to exception handler;
}
```

The system exception handler, rather than calling the instrumentation code directly, interfaces through an intermediate routine, that takes care of saving the return address and the system state (setjmp( ) buffer) so as to help recover from any subsequent exception. If the instrumentation code generates another exception, the exception handler that gets executed (via the fault handler) will take care to reset the return address from the exception, to a known trampoline address. The trampoline code will then use the information gathered to redirect a return from exception to the return address at the system exception handler and not to the point in instrumentation code that generated the exception.

As disclosed above, the system 300 comprising a processor, a memory, a computer readable medium coupled to the processor, and a software comprising instruction encoded in the computer readable medium and executable by the processor causing the processor to perform the steps as disclosed previously. The system is configured to execute the instruction in the kernel space wherein a probe is inserted at an identified location of the instruction and the instruction being copied to a predefined location. The system further generates a first exception upon encountering the probe and calling a first exception handler and the first exception handler is configured to call a instrumentation routine. The system further generates a second exception when a instrumentation routine encounters an error and calling a second exception handler. Finally the system is configured to return the system to a sane state to continue normal execution of the instruction by recovering from the exceptions.

In a further embodiment is disclosed a computer program product comprising a computer readable medium having a computer readable program comprising software, wherein the computer readable program when executed on a computer causing the computer to: execute the instruction in the kernel space wherein a probe is inserted at a identified location of the instruction and the instruction being copied to a predefined location; generate a first exception upon encountering the probe, save a system register state as part of the first exception; execute the first exception handler; save the register contents of a first trampoline [setjmp( )] prior to executing a instrumentation routine, and the first exception handler is configured to call the instrumentation routine; generate a second exception when a instrumentation routine encounters an error and calling a second exception handler, the second exception handler returns to a second trampoline [longjmp( )] instead of returning to the instrumentation routine that generated the exception; the second trampoline [longjmp( )] configured to recover from the exceptions and return to a sane state.

In a further embodiment a signal bearing medium tangibly embodying a set of instructions, preferably machine readable instruction executable on a processor of a computing system, the set of instruction when loaded on the processor of the device and execute thereon is configured to perform the method as disclosed previously, thereby bringing the system back to sane state and continue normal execution of the program.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Therefore, it is desired that the embodiments described herein be considered in all respects as illustrative, not restrictive, and that reference be made to the appended claims for determining the scope of the invention.

Although the invention has been described with reference to the embodiments described above, it will be evident that other embodiments may be alternatively used to achieve the same object. The scope of the invention is not limited to the embodiments described above, but can also be applied to software programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware comprising several distinct elements.

What is claimed is:

1. A method of instrumentation for a software instruction, the method comprising:
   identifying a location in the instruction to insert a probe, wherein the probe is a breakpoint;
   replacing the instruction with the probe by copying the instruction to a predefined location;
   executing, by a processor, the instruction in a kernel space;
   generating a first exception upon encountering the probe and calling a first exception handler, wherein the first exception handler is configured to call an instrumentation routine;
   saving a system register state as part of the first exception;
   executing the first exception handler;
   saving register contents of a first trampoline prior to executing the instrumentation routine;
   generating a second exception when the instrumentation routine encounters an error and calling a second exception handler; and
   responsive to determining that the second exception is due to code of the instrumentation routine that was executed in a context of the first exception, returning from the second exception handler to a second trampoline instead of returning to the instrumentation routine that generated the exception;
   recovering from the first and second exceptions and returning a system to a sane state to continue normal execution of the instruction, wherein the second trampoline restores the system to the sane state.

2. The method of claim 1, further comprising:
   associating the instrumentation routine to be executed upon encountering the probe.

3. The method of claim 2, wherein the instrumentation routine enables a user to access relevant tracing or debugging information.

4. The method of claim 1, wherein saving the register contents includes collecting essential debug information.

5. The method of claim 1, wherein replacing the instruction with the probe further comprises flushing a processor cache if required.

6. A system comprising:
   a processor,
   a memory,
   a computer readable storage device coupled to the processor, and
   a software comprising instruction encoded in the computer readable storage device and executable by the processor causing the processor to:
      execute an instruction in a kernel space wherein a probe is inserted at an identified location of the instruction and the instruction is copied to a predefined location;
      generate a first exception upon encountering the probe and calling a first exception handler and the first exception handler is configured to call a instrumentation routine;
      save a system register state as part of the first exception;
      execute the first exception handler;
      save register contents of a first trampoline prior to executing the instrumentation routine;
      generate a second exception when an instrumentation routine encounters an error and calling a second exception handler;
      responsive to determining that the second exception is due to code of the instrumentation routine that was executed in a context of the first exception, return from the second exception handler to a second trampoline instead of returning to the instrumentation routine that generated the exception; and
      return the system to a sane state to continue normal execution of the instruction by recovering from the exceptions, wherein the second trampoline restores the system to the sane state.

7. The system of claim 6, wherein the instrumentation routine is associated to be executed upon encountering the probe.

8. The system of claim 6, wherein saving the register contents includes collecting essential debug information.

9. The system of claim 6, wherein replacing the instruction with the probe further comprises flushing a processor cache if required.

10. A computer program product comprising a computer readable storage device having a computer readable program comprising software, wherein the computer readable program when executed on a computer causes the computer to:
   execute an instruction in a kernel space wherein a probe is inserted at an identified location of the instruction and the instruction is copied to a predefined location;
   generate a first exception upon encountering the probe, save a system register state as part of the first exception; execute a first exception handler; save register contents of a first trampoline [setjmp( )] prior to executing an instrumentation routine, and the first exception handler is configured to call the instrumentation routine;
   generate a second exception when the instrumentation routine encounters an error and calling a second exception handler;
   responsive to determining that the second exception is due to code of the instrumentation routine that was executed in a context of the first exception, return from the second exception handler to a second trampoline [longjmp( )] instead of returning to the instrumentation routine that generated the exception; and
   the second trampoline [longjmp( )] is configured to recover from the exceptions to continue normal execution of the instruction and return to the system to a sane state.

11. A method of instrumentation for software instructions that are executable on a processor of a device, the method comprising:
   executing the instruction in a kernel space wherein a probe is inserted at an identified location of the instruction and the instruction is copied to a predefined location;

generating a first exception upon encountering the probe, saving a system register state as part of the first exception;

executing a first exception handler;

saving register contents of a first trampoline [setjmp( )]0 prior to executing an instrumentation routine, and the first exception handler is configured to call the instrumentation routine;

generating a second exception when the instrumentation routine encounters an error and calling a second exception handler;

responsive to determining that the second exception is due to code of the instrumentation routine that was executed in a context of the first exception, returning from the second exception handler to a second trampoline [longjmp( )] instead of returning to the instrumentation routine that generated the exception; and returning the system to a sane state to continue normal execution of the instruction by recovering from the exceptions, wherein the second trampoline [longjmp( )] restores the system to the sane state.

\* \* \* \* \*